Patented Apr. 22, 1930

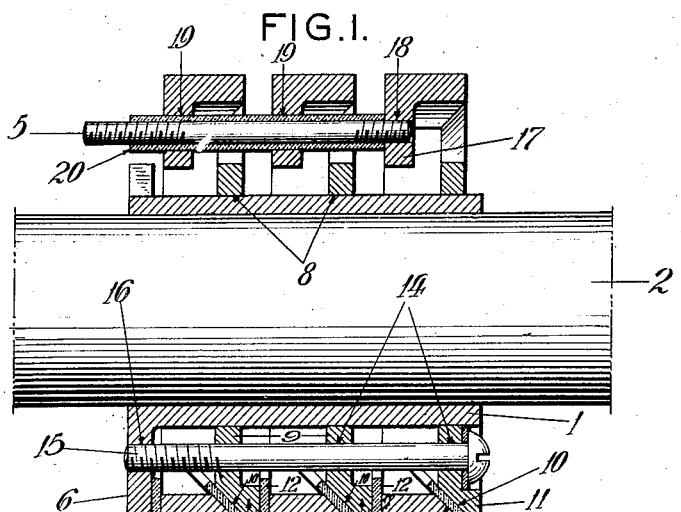
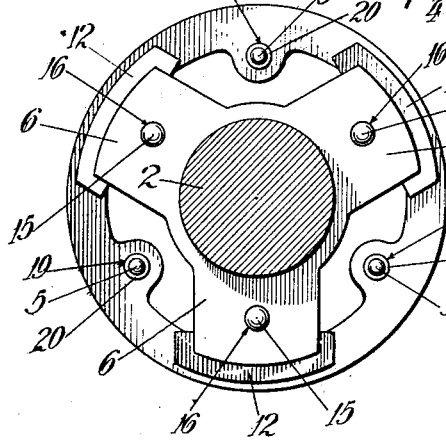
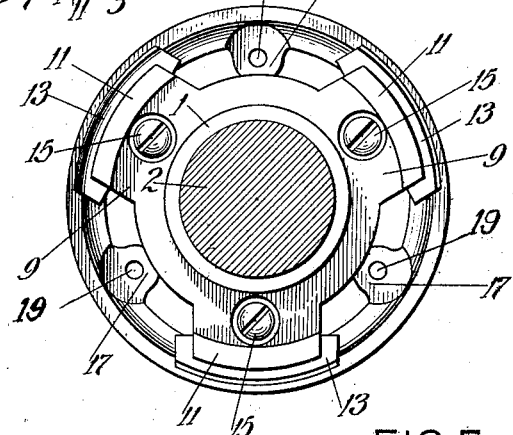
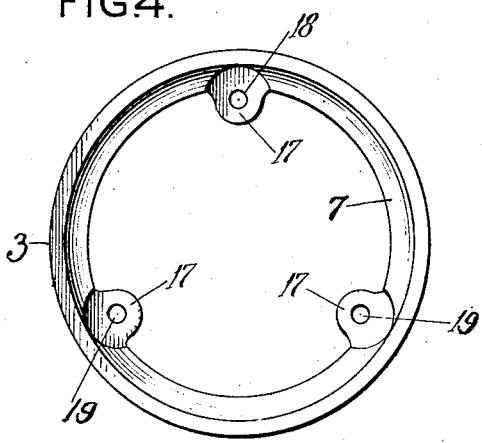
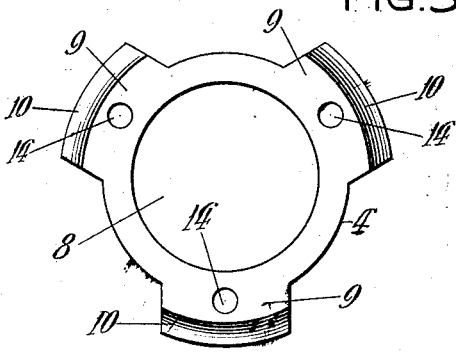

1,756,004

UNITED STATES PATENT OFFICE

JOHN M. BARR, OF CLEVELAND, OHIO, AND HAROLD L. SMITH, OF MILWAUKEE, WISCONSIN, ASSIGNORS TO THE LOUIS ALLIS COMPANY, OF MILWAUKEE, WISCONSIN, A CORPORATION OF WISCONSIN

CURRENT COLLECTOR

Continuation of application Serial No. 594,081, filed October 12, 1922. This application filed April 22, 1929. Serial No. 357,200.

This invention relates to a current collector for dynamo electric machines.

This application is a continuation of our copending application Serial No. 594,081, filed October 12, 1922, as to matter common to both applications.

An object of the invention is to provide a current collector in which the collector rings are firmly held in place during expansion and contraction thereof.

Another object is to provide a current collector in which the collector rings are secured upon a shaft or rotor and held in concentric relation thereto by continual resilient pressure.

Another object is to provide a current collector from which heat will be rapidly dissipated.

Another object is to provide a current collector having ventilating passages through and between the collector rings.

Another object is to provide a current collector having a relatively small overall diameter.

Another object is to provide a current collector from which the collector rings may be readily removed after the collector has been installed upon a dynamo electric machine.

Another object is to provide a current collector which may be readily and economically manufactured.

According to the invention as ordinarily embodied, the collector ring is held firmly in place by a ring support which exerts continual radial and axial pressure thereon.

The ring support grips the hub at points spaced around the periphery thereof and holds the collector ring concentric therewith.

The collector ring is spaced from the hub of the collector by the ring support to provide a ventilating space therebetween.

Adjacent collector rings are spaced from each other by the ring support to provide a ventilating space between the rings.

A current collector embodying the invention is shown in the accompanying drawing in which the views are as follows:

Fig. 1 is a central longitudinal section through the current collector.

Fig. 2 is an end view thereof.

Fig. 3 is a view of the opposite end.

Fig. 4 is an elevation of one of the collector rings.

Fig. 5 is an elevation of one of the ring supports.

The current collector comprises, in general, a hub 1 for attachment to the shaft 2 or other rotating part of a dynamo electric machine, collector rings 3 to be engaged by the brushes of the dynamo electric machine, ring supports 4 to fix the rings in position concentric with the hub, means to clamp the rings, ring supports and hub together, and conductors 5 to connect the rings to the rotor windings of the dynamo electric machine.

The hub 1 is adapted to be fixed for rotation with the shaft 2, or other rotating part of a dynamo electric machine, and is provided at one end with radial arms 6 against which the collector rings are clamped.

Any number of collector rings may be employed and one face of each ring is provided with a beveled surface 7.

Each ring support 4 has a bore 8, to receive the hub 1, and equally spaced radial arms 9 which are provided on one face with beveled surfaces 10 to coact with the beveled surface 7 on the collector ring and hold the ring concentric with the hub 1.

The opposite face of each arm 9 is provided with a shoulder 11 to stiffen the arm and to space adjacent rings from each other.

The collector rings 3 are insulated from the shoulders 11 on the supports 4 and the arms 6 on the hub 1 by insulation 12 and from the beveled surfaces 10 on the supports 4 by insulators 13.

The arms 9 of the ring supports are provided with holes 14 through which bolts 15 are passed and threaded into threaded holes 16 in the arms 6 of the hub to clamp the collector rings and the ring supports on the hub.

The pressure exerted by the bolts 15 clamps the collector rings and ring supports together, forces the end ring against the arms 6 of the hub and, due to the beveled surfaces 7 and 10 being forced together, tends to force the collector rings outwardly away from the hub, thus continual radial and axial pressure is exerted upon the rings.

The ring supports 4 are sufficiently flexible and resilient to allow the arms 9 to be forced inwardly and caused to grip the hub 1 while the parts of the supports between the arms 9 are sprung outwardly, thus assuring a three point contact between each ring support and the hub and positively centering the collector ring.

The radial pressure exerted by the ring supports upon the hub assures a three point support for each collector ring even if the bore 8 is somewhat larger than the hub 1.

The ring supports 4 may be divided between two of the arms 9 to compensate for variations in diameters and to allow the ring support to be seated more readily upon the hub.

The radial pressure exerted by the arms 9 places the collector rings under tension and the resiliency of the ring supports 4 maintains this tension and prevents the rings from loosening when the same expand due to the heat generated by the machine upon which the collector is installed.

The collector rings are preferably made interchangeable and provided with three inwardly extending lugs 17, one of which has a threaded hole 18 and the other two have larger holes 19.

One of the conductors 5 is threaded into each hole 18 and connected to the winding of the rotor of the machine upon which the collector is installed.

The conductors 5 are of different lengths and the shortest one is threaded into the hole 18 in the collector ring nearest the rotor.

The longest conductor 5 is threaded into the hole 18 in the collector ring farthest from the rotor, passes through the holes 19 in the other rings, and is insulated from those rings by an insulating bushing 20, as shown in Fig. 1.

The intermediate collector ring is connected to the rotor winding by a conductor 5 of intermediate length which is threaded into the threaded hole 18 in that ring, passes through the hole 19 in the inside ring and is insulated therefrom by a bushing which is shorter than bushing 20.

If the insulations 11 and 12 are composed of sheets of mica held together by a binder, such as shellac, the collector is assembled, the bolts 15 tightened sufficiently to hold the several parts together, and the collector subjected to the action of heat to drive off the volatile parts of the binder.

After the insulation has been baked and the collector has cooled, the bolts are tightened to firmly clamp the ring supports on the hub and to place the collector rings under tension.

The collector may be mounted upon the shaft or other rotating part of a dynamo electric machine with the arms 6 of the hub toward the rotor, leaving the heads of the bolts 15 readily accessible to permit adjustments, repairs or replacements.

By supporting the collector rings in the manner shown and described, the same will not loosen when expanded by heat, air passages are provided between adjacent rings and between the rings and the hub, the rings and supports may be readily removed and replaced without detaching the collector from the machine, and the outside diameter of the collector rings may be small relatively to the diameter of the rotor shaft or other rotating part upon which the collector is mounted.

The current collector herein set forth may be provided with any number of rings and modified in various ways without departing from the scope of the invention as hereafter claimed.

The invention is claimed as follows:

1. A current collector comprising a collector ring, and a ring support shaped to hold and support said collector ring in place by exerting radial and axial pressure thereon and to provide ventilating spaces between the same and said collector ring.

2. A current collector comprising collector rings, and intermediate ring supports shaped to hold and support said collector rings in place by exerting radial and axial pressure thereon and to provide ventilating spaces between the same and said collector rings.

3. A current collector comprising a collector ring, a ring support shaped to hold and support said collector ring in place by exerting radial and axial pressure thereon and to provide ventilating spaces between the same and said collector ring, and means to clamp said collector ring and said ring support together.

4. A current collector comprising collector rings, intermediate ring supports shaped to hold and support said collector rings in place by exerting radial and axial pressure thereon and to provide ventilating spaces between the same and said collector rings, and means to clamp said collector rings and said ring supports together.

5. A current collector comprising a hub, collector rings surrounding said hub and spaced therefrom, and ring supports carried by said hub and insulated from said collector rings to hold the same in fixed concentric relation to said hub and allow a circulation of air between said rings and said hub.

6. A current collector comprising a hub, collector rings surrounding said hub and spaced therefrom, ring supports carried by said hub to hold said collector rings in fixed concentric relation to said hub and allow a circulation of air between adjacent rings and between said rings and said hub, and insulation arranged between said collector rings and said ring supports.

7. A current collector comprising a hub, collector rings surrounding said hub and spaced therefrom, ring supports carried by said hub to hold said collector rings in fixed concentric relation to said hub and allow a circulation of air between said rings and said hub, shoulders carried by said ring supports to space adjacent collector rings from each other and allow a circulation of air therebetween, and insulation arranged between said collector rings and said ring supports.

8. A current collector comprising a hub, collector rings surrounding said hub and spaced therefrom, and ring supports arranged on said hub and shaped to support said collector rings by exerting radial and axial pressure thereon and to provide ventilating space between adjacent collector rings and between said collector rings and said hub.

9. A current collector comprising a hub, collector rings surrounding said hub and spaced therefrom, ring supports carried by said hub and having radial arms to hold said rings in place by exerting a continual radial and axial pressure thereon and to provide air passages between adjacent rings, and means passing through said radial arms to clamp said ring supports and said collector rings to said hub.

10. A current collector comprising a hub having radial arms at one end thereof, collector rings surrounding said hub and spaced therefrom, ring supports carried by said hub and having radial arms to hold said rings in place by exerting a continual radial and axial pressure thereon, and means passing through the arms of said ring supports and said hub to clamp said ring supports and said collector rings to said hub.

11. A current collector comprising a hub having a fixed flange, a collector ring surrounding said hub and spaced therefrom, a ring support shaped to hold and support said collector ring in place between the same and said flange by exerting radial and axial pressure thereon and to provide ventilating spaces between the same and said collector ring, and means to draw said ring support toward said flange to cause said collector ring to be clamped between the same and said flange.

12. A current collector comprising a hub having a fixed flange, a collector ring surrounding said hub and spaced therefrom, a ring support shaped to hold and support said collector ring in place between the same and said flange by exerting radial and axial pressure thereon and to provide ventilating spaces between the same and said collector ring, and a bolt connecting said flange and said ring support to cause said collector ring to be clamped between the same.

13. A current collector comprising a hub, a collector ring surrounding said hub and spaced therefrom, a flexible ring support arranged on said hub to hold said collector ring in place thereon, and means to distort said ring support and cause the same to engage said hub and be fixed thereto.

14. A current collector comprising a hub, collector rings surrounding said hub and spaced therefrom, flexible ring supports arranged on said hub to hold said collector rings in place thereon and to space the same from each other, and means to simultaneously distort said ring supports and cause the same to engage said hub and be fixed thereto.

15. A current collector comprising a hub, a collector ring surrounding said hub and spaced therefrom, a flexible ring support arranged on said hub to hold said collector ring in place thereon, and means to distort said ring support and cause the same to engage said hub at points spaced around the periphery thereof and to be fixed thereto.

16. A current collector comprising a hub, collector rings surrounding said hub and having internal beveled surfaces, ring supports arranged on said hub and having radial arms provided with external beveled surfaces to coact with the beveled surfaces on said collector rings, and means to wedge said ring supports between said collector rings and said hub.

17. A current collector comprising a hub, a flange carried by said hub, a ring support arranged on said hub, radial arms carried by said ring support and having beveled surfaces at the outer ends thereof, a collector ring having a beveled surface to coact with the beveled surfaces on said arms, and means to clamp said collector ring between said flange and said ring support.

18. A current collector comprising a hub having arms extending radially from one end thereof, a ring support arranged on said hub and having radial arms provided with beveled surfaces at the outer ends thereof, a collector ring surrounding said hub and having beveled surfaces to coact with the beveled surfaces on the arms of said ring support, and means to clamp said collector ring between the arms of said ring support and the arms of said hub and to wedge the arms of said ring supports between said collector rings and said hub.

19. A current collector comprising a hub having arms extending radially from one end thereof, ring supports arranged on said hub and having radial arms provided with beveled surfaces on the outer ends thereof, collector rings surrounding said hub and having beveled surfaces to coact with the beveled surfaces on the arms of said ring supports, and bolts extending through the arms of said ring supports and threaded into the arms of said hub to clamp said collector rings, ring supports and hub together.

20. A current collector comprising a hub having arms extending radially from one end thereof, ring supports arranged on said hub and having radial arms provided with beveled surfaces on the outer ends thereof, collector rings surrounding said hub and having beveled surfaces to coact with the beveled surfaces on the arms of said ring supports, shoulders carried by the arms of said ring supports to space said collector rings from each other, and bolts extending through the arms of said ring supports and threaded into the arms of said hub to clamp said collector rings, ring supports and hub together.

In witness whereof, we have hereunto subscribed our names.

JOHN M. BARR.
HAROLD L. SMITH.